(12) United States Patent
Trinh et al.

(10) Patent No.: US 10,854,023 B1
(45) Date of Patent: Dec. 1, 2020

(54) TRACTOR-TRAILER DATA LINK FOR A SEMI-TRUCK

(71) Applicant: Lytx, Inc., San Diego, CA (US)

(72) Inventors: Lanh Trinh, Carlsbad, CA (US); Gregory Dean Sutton, Del Mar, CA (US)

(73) Assignee: Lytx, Inc., San Diego, CA (US)

( * ) Notice: Subject to any disclaimer, the term of this patent is extended or adjusted under 35 U.S.C. 154(b) by 275 days.

(21) Appl. No.: 15/905,642

(22) Filed: Feb. 26, 2018

(51) Int. Cl.
*G07C 5/00* (2006.01)
*H04L 27/00* (2006.01)
*B60R 1/00* (2006.01)
*G07C 5/08* (2006.01)
*H04L 27/26* (2006.01)
*H04L 29/08* (2006.01)

(52) U.S. Cl.
CPC ............... *G07C 5/008* (2013.01); *B60R 1/00* (2013.01); *G07C 5/085* (2013.01); *H04L 27/0002* (2013.01); *H04L 27/2627* (2013.01); *H04L 67/12* (2013.01)

(58) Field of Classification Search
CPC .......... G07C 5/008; G07C 5/085; B60R 1/00; H04L 27/0002; H04L 27/2627
See application file for complete search history.

(56) References Cited

U.S. PATENT DOCUMENTS 8,276,996 B2   10/2012   Lesesky
2017/0240125 A1*  8/2017  Weigert ................... B60Q 1/34

OTHER PUBLICATIONS

The Haulite Corporation "Tractor Trailer Powerline Communications" Website, Accessed Nov. 10, 2017 at http://www.haulitecorp.com/company-profile/tractor-trailorpowerline-communications.html.
Wikipedia "ISO Standards for trailer connectors" Website, Accessed Nov. 10, 2017 at https://en.wikipedia.org/wiki/ISO_standards_for_trailer_connectors.

* cited by examiner

*Primary Examiner* — Michael D Lang
(74) *Attorney, Agent, or Firm* — Van Pelt, Yi & James LLP (57) ABSTRACT

A system for a trailer mounted data sensor includes a sensor and a modem. The sensor is configured to produce a sensor data signal that is mounted on a vehicle trailer. The modem is configured to modulate the sensor data signal to create a modulated sensor data signal. The modulated sensor data signal is transmitted using a first line. The first line is coupled via a harness to electronics mounted on a vehicle.

20 Claims, 13 Drawing Sheets

TRACTOR-TRAILER DATA LINK FOR A SEMI-TRUCK

BACKGROUND OF THE INVENTION

Modern vehicles can include a vehicle event recorder in order to better understand the timeline of an anomalous event (e.g., an accident). A vehicle event recorder typically includes a set of sensors—for example, video recorders, audio recorders, accelerometers, gyroscopes, vehicle state sensors, global positioning system (GPS), etc., that report data, which is used to determine the occurrence of an anomalous event. Large tractor-trailer trucks benefit from sensors placed on the trailer, for example, side or rear facing cameras at the rear of the trailer. However, extra wires for transmitting the sensor data to the vehicle event recorder in the vehicle cab cannot be added as they are incompatible with the standard connector between a tractor and its trailer. Wireless techniques for data transfer are unreliable especially when the vehicles are in a depot and many tractors and trailers are nearby one another creating interference. This creates a problem wherein transmitting sensor data to the vehicle event recorder is difficult.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for a trailer mounted data sensor is disclosed. The system comprises a sensor and a modem. The sensor is configured to produce a data signal that is mounted on a vehicle trailer. The modem is configured to modulate the sensor data signal to create a modulated sensor data signal. The modulated sensor data signal is transmitted using a first line. The first line is coupled via a harness to electronics mounted on a vehicle.

A system for a trailer mounted data sensor comprises a system configured to transmit sensor data from a sensor mounted on a vehicle trailer to electronics mounted on the vehicle. The system is designed to overcome the problem of communicating the signals from a sensor mounted on a trailer and electronics mounted on a vehicle (e.g., a big rig truck). Both wired and wireless connections are difficult. The wired connection is problematic because of the standard connectivity interface between the vehicle and the trailer, which has a limited number of electrical connections and does not have extra connections for a separate data transmission line. The wireless connection is problematic due to interference issues (e.g., other vehicles, metallic obstacles, other WiFi transmitters, etc.). The sensor typically comprises a video camera, a digital camera, a microphone, an accelerometer, a gyroscope, etc. Sensor data is modulated using a modem and transmitted via lines of the electrical harness coupling the vehicle to the vehicle trailer. The electrical harness includes a connector (e.g., a society of automotive engineers (SAE) J560 connector or European ISO 1724 connector) that makes electrical connections between a main vehicle (e.g., a tractor, a truck cab, etc.) and a trailer. The electrical connections include connections for auxiliary power, ground, tail lights, reverse lights, right turn signal, left turn signal, and electric brakes. Auxiliary power and ground connections are used to power the sensor, modem, and any other electronics mounted on the vehicle trailer. Modulated data is coupled (e.g., using a capacitive coupling) to one or more lines of the electrical harness, for example, two lines (e.g., the right turn signal and the left turn signal). Capacitive coupling (AC coupling) allows the normal DC-low frequency functionality (e.g., 5 Hz or less) of the lighting signals (e.g., turn signals, brakes, blinkers lights etc.), while the modulated speed data signaling occupies a higher RF spectrum on these wires (e.g., above 1 MHz). Therefore lighting signaling and data signal are mutually non-interfering on the same wires. The signal may be transmitted differentially for better noise immunity. The lines carry the modulated data back to the vehicle. A second modem on the vehicle demodulates the modulated data to produce the original sensor data. The sensor data is then processed by a vehicle event recorder.

The modem for modulating the sensor data may utilize a network protocol (e.g., Ethernet) for communication with the data source. The data source includes or is coupled to a network adapter for communicating with the modem utilizing the network protocol. Some applications of the system for a trailer mounted data sensor utilize a plurality of data sources. For example, a trailer has three video cameras mounted in different locations, the trailer has a video camera and two accelerometers, the trailer has an array of ten microphones in different locations, etc. The system can accommodate multiple sensors in either of two ways. Using a first approach, each sensor has an associated network interface, and the plurality of network interfaces are coupled to a shared network switch. The network switch allows the plurality of network interfaces to simultaneously communicate with the modem. The modem then modulates the combined network signal for transmission across the harness to the vehicle. Using a second approach, each sensor has an associated network interface and an associated modem. Each modem of the plurality of modems is coupled to the two lines of the harness used for data transmission. A multiplexing scheme, for example, time domain multiple accessing, is used to share the lines between the multiple modems. A single modem mounted on the vehicle is able to demodulate the multiplexed signal and extract data associated with each sensor.

The system is an improvement over typical configurations by enabling communication with one or more added data producing electronic devices in a trailer without requiring additional wires to pass between the vehicle and the trailer. In addition, the system provides reliable wired communication instead of wireless communication between the vehicle and its trailer. Also, by time or frequency multiplexing signals and using existing wiring (e.g., wiring to lights) reliable signaling can occur to multiple sensors or cameras producing data in a trailer that is sending data to a vehicle towing the trailer.

Figure 1:
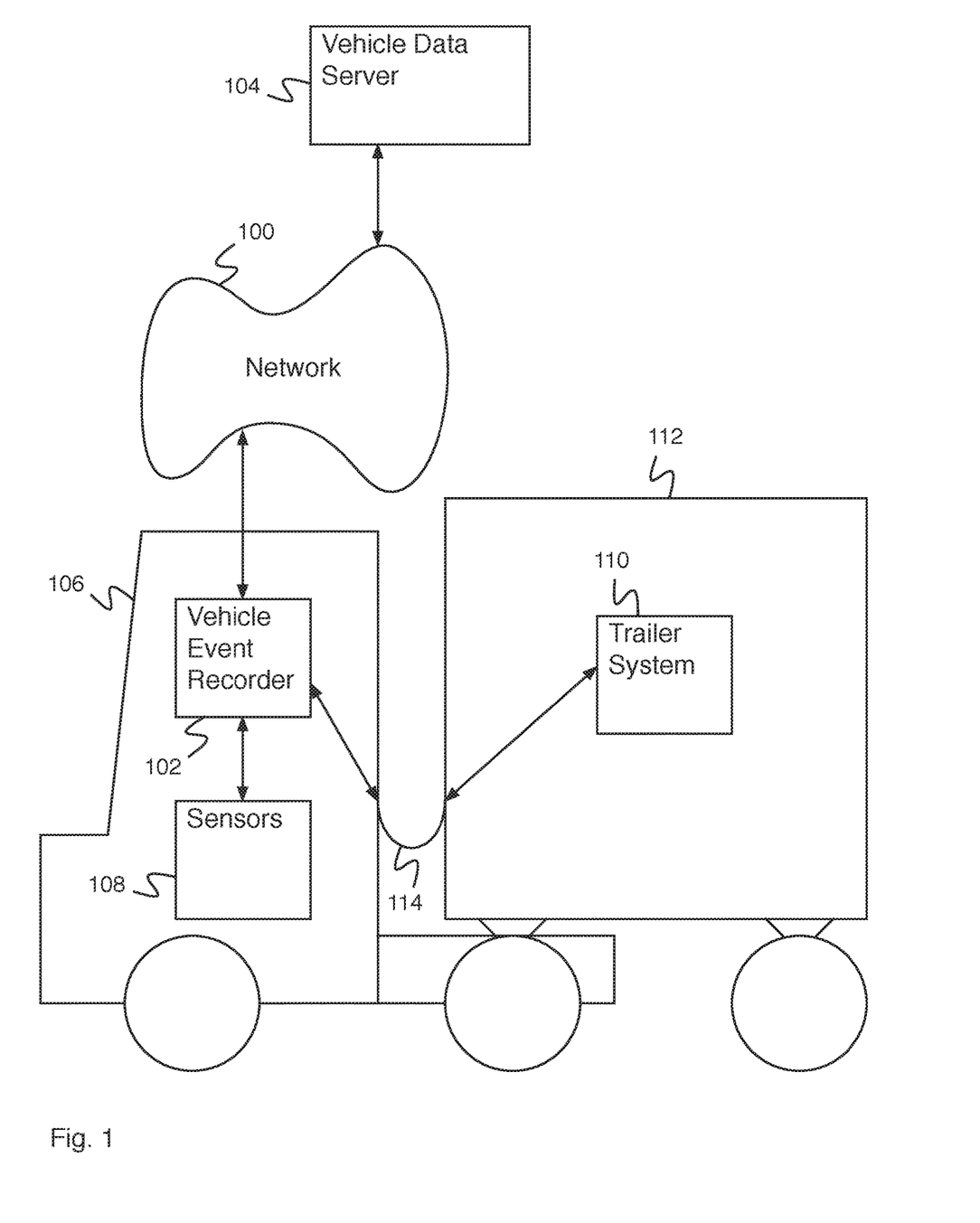
FIG. 1 is a block diagram illustrating an embodiment of a system including a vehicle event recorder.

FIG. 1 is a block diagram illustrating an embodiment of a system including a vehicle event recorder. In the example shown, trailer system 110 mounted on trailer 112 includes sensors that take data (e.g., a video camera, an accelerometer, etc.). The data is transmitted after being modulated using a modem for transmission over wires in harness 114 that are used to electrically connect trailer system 110 and electronics mounted on vehicle 106 (e.g., electronic components such vehicle event recorder 102). Vehicle event recorder 102 receives the data by demodulating the signal that is received via wires in harness 114. Vehicle event recorder 102 is in communication with sensors 108, trailer system 110, and vehicle data server 104 via network 100. The data received from sensors can be sent to vehicle data server 104 in either raw or processed form.

Sensors 108 or trailer system 100 include sets of sensors, for example, one or more video recorders, cameras, audio recorders, accelerometers, gyroscopes, vehicle state sensors, proximity sensors, a global positioning system (e.g., GPS), outdoor temperature sensors, moisture sensors, laser line tracker sensors, etc. Vehicle state sensors comprise internal vehicle state sensors, for example a speedometer, an accelerator pedal sensor, a brake pedal sensor, an engine revolutions per minute (e.g., RPM) sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, etc. Vehicle event recorder 102 comprises a system for receiving and processing sensor data. Processing sensor data comprises filtering data, identifying patterns in data, detecting events, etc. Vehicle event recorder 102 is mounted on vehicle 106 in any appropriate location, for example the chassis, the front grill, the dashboard, the rear-view minor, the rear window or wall, the floor, etc. There are times when vehicle event recorder 102 comprises multiple units mounted in different locations within vehicle 106 instead of a single unit, particularly when there are space constraints for a given location (e.g., behind the rear view minor) and more space is required to house electronic components. Vehicle event recorder 102 comprises a communications system for communicating with network 100. Network 100 comprises a network for communications. Network 100 comprises one or more of a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, etc.

When vehicle 106 travels, sensors 108 and/or trailer system 110 capture sensor data (e.g., video data, audio data, accelerometer data, etc.). The sensor data is received by vehicle event recorder 102. Vehicle event recorder 102 uses the data to determine events (for example, collision events, hazardous maneuver events, distracted driving events, etc.). Sensors 108 are mounted on vehicle 106 and coupled directly to vehicle event recorder 102.

Figure 2:
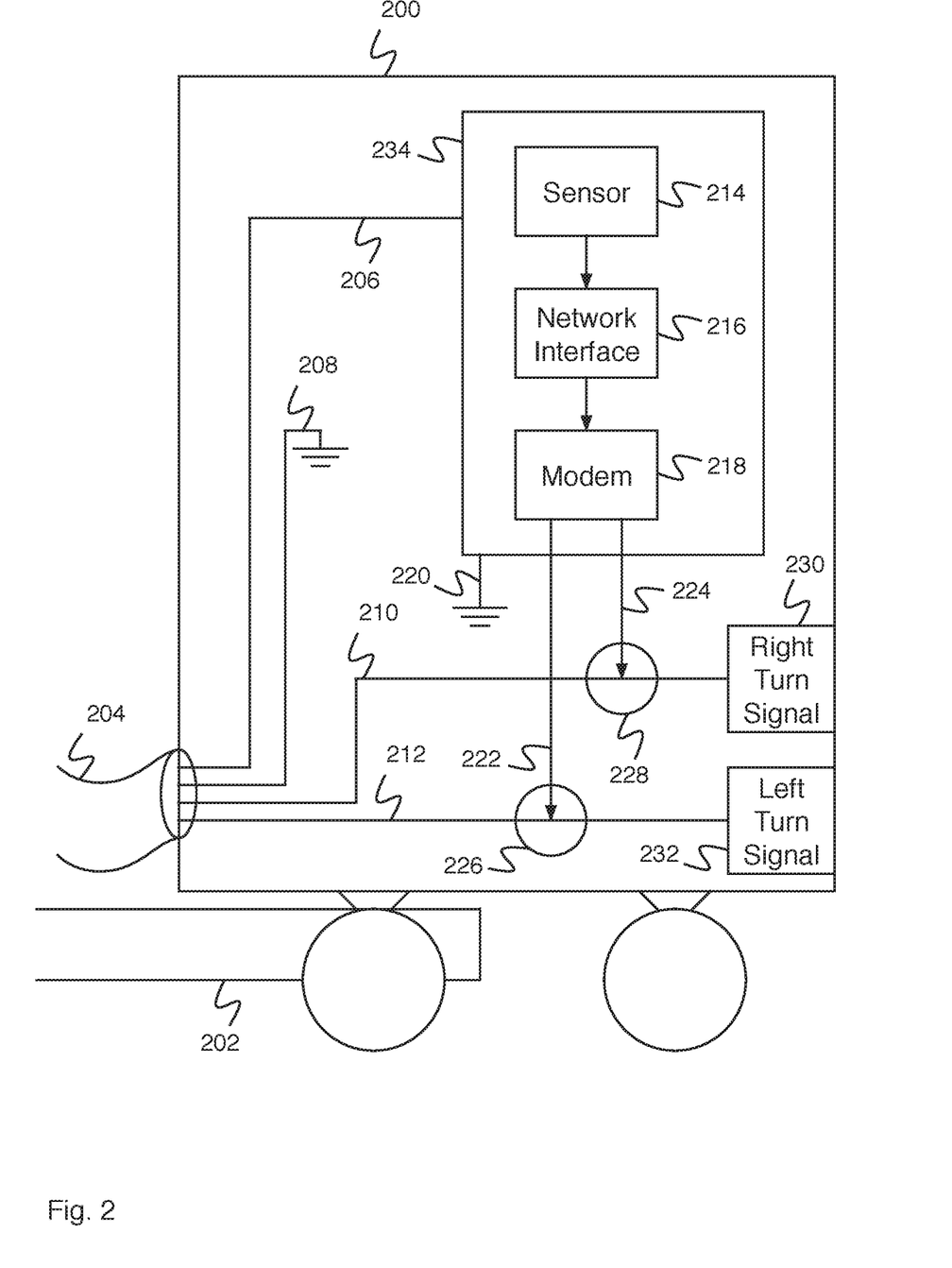
FIG. 2 is a block diagram illustrating an embodiment of a trailer.

FIG. 2 is a block diagram illustrating an embodiment of a trailer. In some embodiments, trailer 200 comprises trailer 112 of FIG. 1. In the example shown, sensor 214 is used to create a data signal that is transmitted from trailer 200 to vehicle 202 via network interface 2016 and modem 218 of trailer system 234. Modem 218 is capacitively coupled to wires that attach to harness 204 (e.g., via wire 224 coupling 228 and via wire 222 and coupling 226) enabling transmission of the sensor data over harness 204 using wires that are specified for other functionality. In the example shown, the wires used for sending the sensor data are wire 210 and wire 212 that are specified for right turn signal 230 and left turn signal 232, respectively.

Trailer 200 is coupled to vehicle 202. Wires of harness 204 electrically couple components mounted on vehicle 202 and components mounted on trailer 200. Harness 204 couples power wire 206, ground wire 208, wire 210 for right turn signal 230, and wire 212 for left turn signal 232. Harness 204 additionally couples any other appropriate wires, for example marker light wires, powered brake wires, brake light wires, reverse light wires, etc. Harness 204 comprises a coupling for coupling wires from trailer 200 to vehicle 202 in a way that can easily be connected when the trailer is hitched to the tractor and disconnected when the trailer is unhitched from the tractor. In some embodiments, harness 204 comprises an SAE J560 connector. Wire 210 comprises a signal/power wire for right turn signal 230, and wire 212 comprises a signal/power wire for left turn signal 232. Sensor 214 comprises a sensor for collecting sensor data. For example, sensor 214 comprises a video camera, a digital camera, a microphone, an accelerometer, a gyroscope, etc. Sensor 214 is powered using power wire 206. Ground wire 208 is connected to the chassis of trailer 200 (for example, to frame of trailer 200). The ground connection of sensor 214 is additionally connected to the chassis of trailer 200. Sensor data from sensor 214 is coupled to modem 218 via network interface 216. Data is transmitted from sensor 214 to modem 218 directly or indirectly (e.g., via analog or digital processing, data conversion, a network interface, etc.). Modem 218 is additionally brought power via power wire 206 and chassis ground. Modem 218 comprises a modem for modulating a sensor data signal. Modem 218 modulates the sensor data signal using an appropriate modulation technique, for example using orthogonal frequency division multiplexing (e.g., OFDM), modulation according to an institute of electrical and electronics (e.g., IEEE) 1901 standard, modulation according to a HomePlug® specification, etc. In the example shown, modem 218 modulates the sensor data signal to create a differential modulated signal (e.g., comprising a positive and negative signal carried on separate wires). When appropriate (for example, when allowed by noise considerations), modem 218 modulates the sensor data signal to create a single-ended modulated signal (e.g., comprising a single signal carried on a single wire).

The modulated signal is output using wire 222 and wire 224 (for example, wire 222 carries the positive side of the modulated signal and wire 224 carries the negative side of the modulated signal). Wire 222 is coupled to wire 212 using coupling 226 and wire 224 is coupled to wire 210 using coupling 228. Coupling 226 and/or coupling 228 comprise couplings for blocking power for a turn signal (e.g., direct current (DC) power) and allowing a modulated signal to pass. For example, coupling 226 and coupling 228 comprise capacitive couplings. The modulated signal output by modem 218 passes through coupling 226 and/or coupling 228 and is carried via wire 210 and wire 212 through harness 204 and to vehicle 202.

Figure 3A:
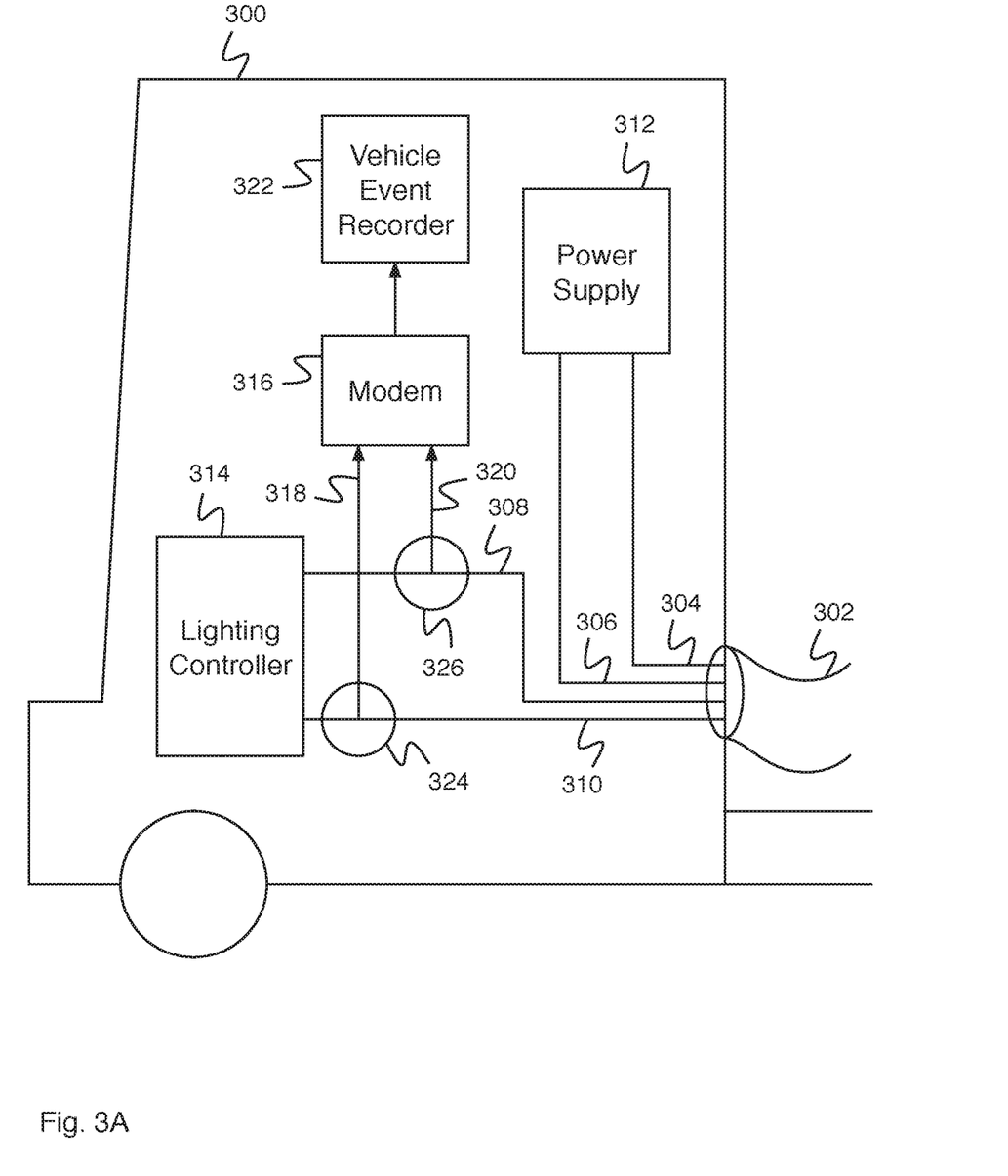
FIG. 3A is a block diagram illustrating an embodiment of a tractor.

FIG. 3A is a block diagram illustrating an embodiment of a tractor. In some embodiments, tractor 300 comprises vehicle 106 of FIG. 1. In the example shown, tractor 300 is coupled to harness 302. For example, harness 302 comprises harness 204 of FIG. 2. Tractor 300 comprises power supply 312 for generating power coupled to power wire 304 referenced to a ground signal coupled to ground wire 306. Tractor 300 additionally comprises lighting controller 314 for generating right turn signal power coupled to right turn signal wire 308 and left turn signal power coupled to left turn signal wire 310. A modulated data signal generated by a modem mounted on a trailer coupled to tractor 300 is carried by right turn signal wire 308 and left turn signal wire 310. The modulated data signal is coupled via coupler 324 from left turn signal wire 310 to signal wire 318 and coupled via coupler 326 from right turn signal wire 308 to signal wire 320. Coupling 324 and coupling 326 comprise couplings for blocking power for a turn signal (e.g., direct current (DC) power) and allowing a modulated signal to pass (e.g., a capacitive coupling). The modulated data signal is carried by signal wire 318 and signal wire 320 to modem 316. Modem 316 demodulates the modulated data signal to recover the original data signal. The original data signal is received by vehicle event recorder 322. Vehicle event recorder 322 comprises a vehicle event recorder for processing sensor data or analyzing sensor data to identify anomalous events. Vehicle event recorder 322 additionally comprises any other appropriate electronics, for instance a data storage device for storing sensor data or processed sensor data, an interface for providing data to a vehicle data server, a video terminal for displaying video to a vehicle driver, etc.

Figure 3B:
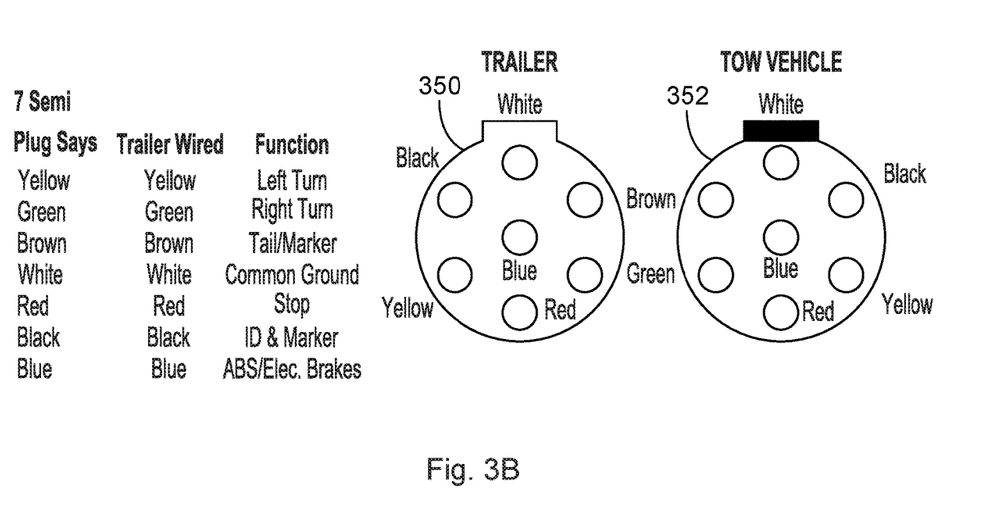
FIG. 3B is a diagram illustrating an embodiment of a connector.

FIG. 3B is a diagram illustrating an embodiment of a connector. In some embodiments, connector diagram 350 and connector diagram 352 are associated with harness 114 of FIG. 1. In the example shown, connector diagram 350 and connector diagram 352 show trailer and vehicle (tow vehicle) connector end diagrams. For example, yellow, green, brown, white, red, black, and blue wire connections that correspond to left turn signal, right turn signal, tail/marker, common ground, stop signal, ID & marker signal, and ABS/Elec. Brakes, respectively. In some embodiments, the connector corresponds to SAE J560 connector. In some embodiments, the connector connectivity corresponds to the 24N wiring code of International Standards Organization (ISO) 1185.

Figure 4:
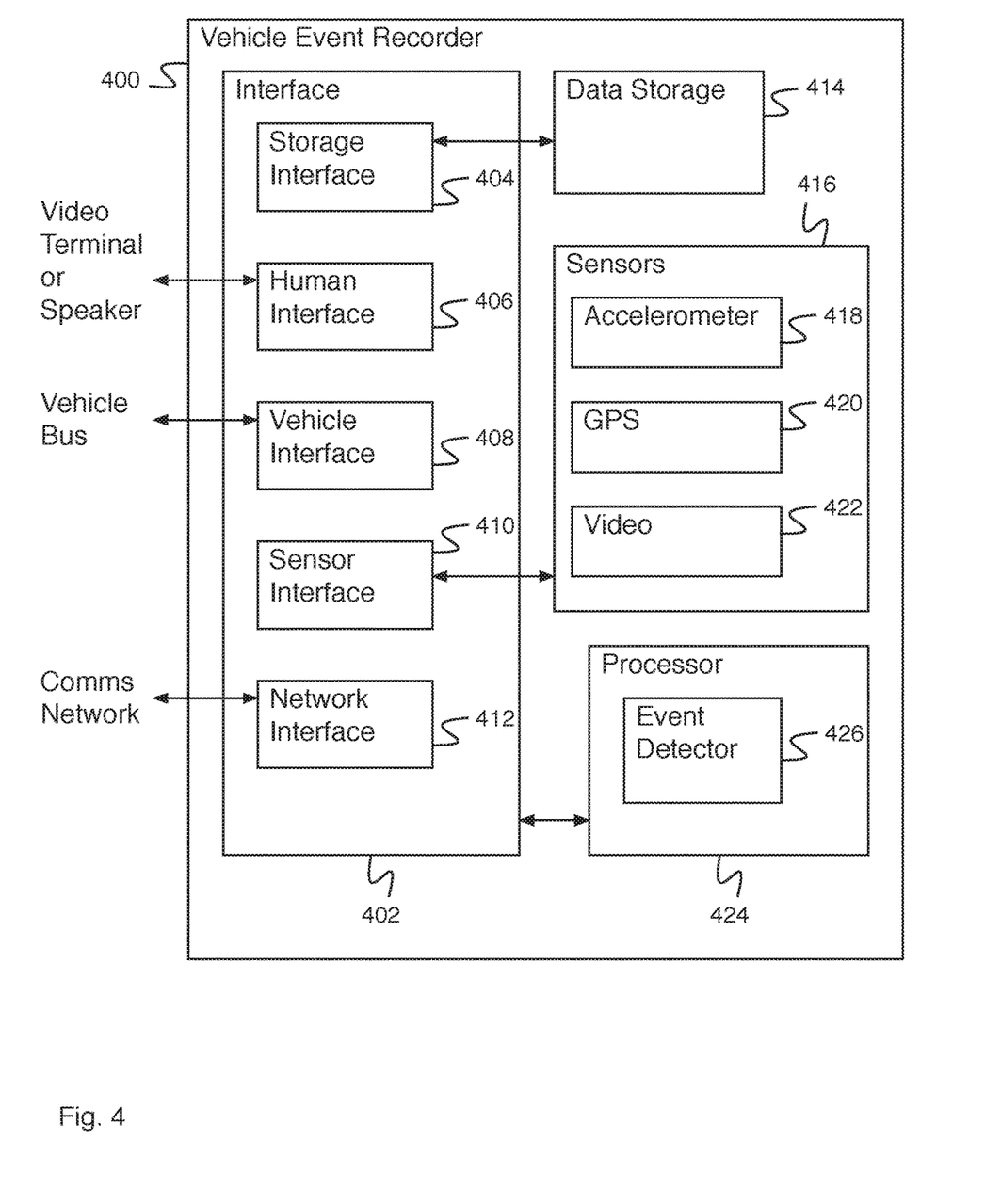
FIG. 4 is a block diagram illustrating an embodiment of a vehicle event recorder.

FIG. 4 is a block diagram illustrating an embodiment of a vehicle event recorder. In some embodiments, vehicle event recorder 400 comprises vehicle event recorder 322 of FIG. 3. In the example shown, vehicle event recorder 400 monitors sensor signals from internal sensors 416 (e.g., accelerometer 418, global position sensor (GPS) 420, video sensor 422), from vehicle sensors via vehicle interface 408, from trailer system sensors via network interface 412. A trailer system sensor generates data and transmits data using a modem that modulates and transmits the data via wiring between the vehicle and the trailer. A modem associated with the vehicle demodulates the data from the wiring (e.g., turn signal wiring, running light wiring, etc.) and provides it to the vehicle event recorder via an interface (e.g., a network interface such as network interface 412, a dedicated modem interface (not shown in FIG. 4)). Vehicle event recorder 400 stores the data in data storage 414 using storage interface 404. Vehicle event recorder 400 evaluates the data using event detector 426 of processor 424 and/or provides data or detected event or processed data to a vehicle data server.

Vehicle event recorder 400 communicates with a vehicle data server using network interface 412 (e.g., using a wired or wireless network such as a WiFi™ or cellular network). Vehicle event recorder 400 transmits sensor data, vehicle data, vehicle identification data, anomalous event data, driver quality data, etc. to the vehicle data server. Vehicle event recorder 400 comprises interface 402. Interface 402 comprises a set of interfaces to other systems. Human interface 406 comprises an interface to a human interaction system—for example, an audio output (e.g., a speaker), a display output, a video terminal, etc. Sensor interface 410 comprises an interface to one or more sensors for receiving sensor data. Sensor interface 410 comprises an interface to one or more vehicle event recorder sensors. In various embodiments, vehicle event recorder sensors comprise an exterior video camera, an exterior still camera, an interior video camera, an interior still camera, a microphone, an accelerometer, a gyroscope, an outdoor temperature sensor, a moisture sensor, a laser line tracker sensor, or any other appropriate sensors. Vehicle interface 408 interfaces with vehicle state sensors possibly including a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, shocks sensors, an engine exhaust sensor, a gear position sensor, a turn signal sensor, a cabin equipment operation sensor, or any other appropriate vehicle state sensors. In some embodiments, vehicle interface 408 comprises a connection to a vehicle bus such as an on-board diagnostics (OBD) bus (e.g., SAE J1939, J1708/J1587, OBD-II, CAN BUS, etc.). In some embodiments, vehicle event recorder 400 communicates with vehicle state sensors via the OBD bus.

Vehicle interface 408 further comprises an interface to one or more vehicle systems (e.g., for adjusting vehicle control parameters, for putting the vehicle in a safe mode, etc.). Network interface 412 comprises a network interface for communicating with other systems via a network. Network interface 412 comprises one or more of a GSM interface, a CDMA interface, an LTE interface, a WiFi interface, an Ethernet interface, a Universal Serial Bus (USB) interface, a Bluetooth™ interface, an Internet interface, etc. Processor 424 comprises a processor for controlling the operations of vehicle event recorder 400, for reading and writing information on data storage 414, for reading and/or writing data via interface 402, etc. Processor 424 comprises event detector 426 for determining events (e.g., collision events, hazardous maneuver events, distracted driving events, etc.).

Data storage 414 comprises a data storage device (e.g., a random access memory (RAM), a read only memory (ROM), a nonvolatile memory, a flash memory, a hard disk, or any other appropriate data storage). Data storage 414 comprises a data storage for storing instructions for processor 424, vehicle event recorder data, vehicle event data, sensor data, video data, driver scores, vehicle information, vehicle identifying information, anomalous event information, driver quality information, etc.

Figure 5:
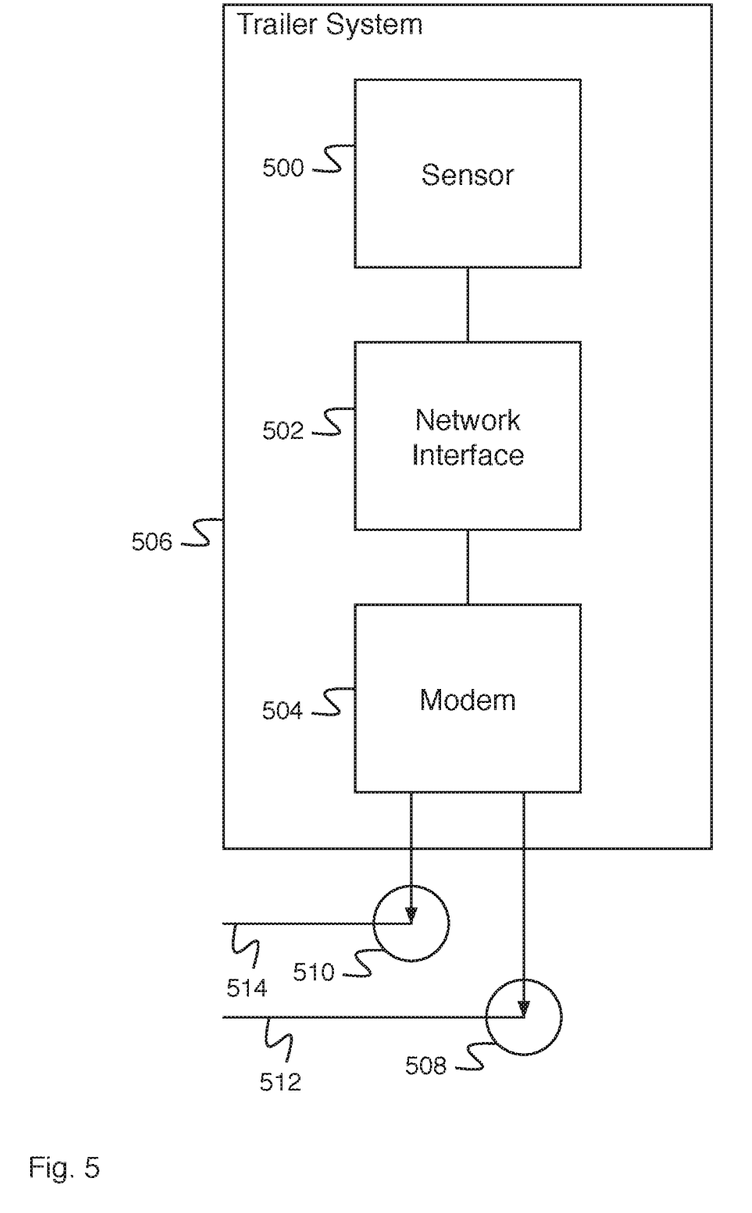
FIG. 5 is a block diagram illustrating an embodiment of a trailer system.

FIG. 5 is a block diagram illustrating an embodiment of a trailer system. In some embodiments, the elements of FIG. 5 are mounted on trailer 200 of FIG. 2. In the example shown, trailer system 506 includes sensor 500, network interface 502, and modem 504. Sensor 500 comprises a sensor for sensing vehicle data or external data. For example, sensor 500 comprises a camera. Sensor 500 is coupled to network interface 502. Network interface 502 comprises an interface for communicating sensor data via a network, for example, an Ethernet network. Network interface 502 additionally comprises any other appropriate signal processing, for instance, preamplification, filtering, encoding, video encoding (e.g., using a standardized video encoding format such as H.264), etc. Network interface 502 transmits sensor data using a network protocol to modem 504. Modem 504 receives sensor data and outputs modulated sensor data. Modulated sensor data is coupled using coupling 510 and coupling 508 onto wire 514 and wire 512. In various embodiments, wire 512 and/or wire 514 comprise a wire used for connecting a vehicle to a turn right signal, a turn left signal, a running light signal, a stop signal, a light signal, a marker signal, a brake signal, an identifier signal, a ground signal, a power signal, or any other appropriate signal.

Figure 6:
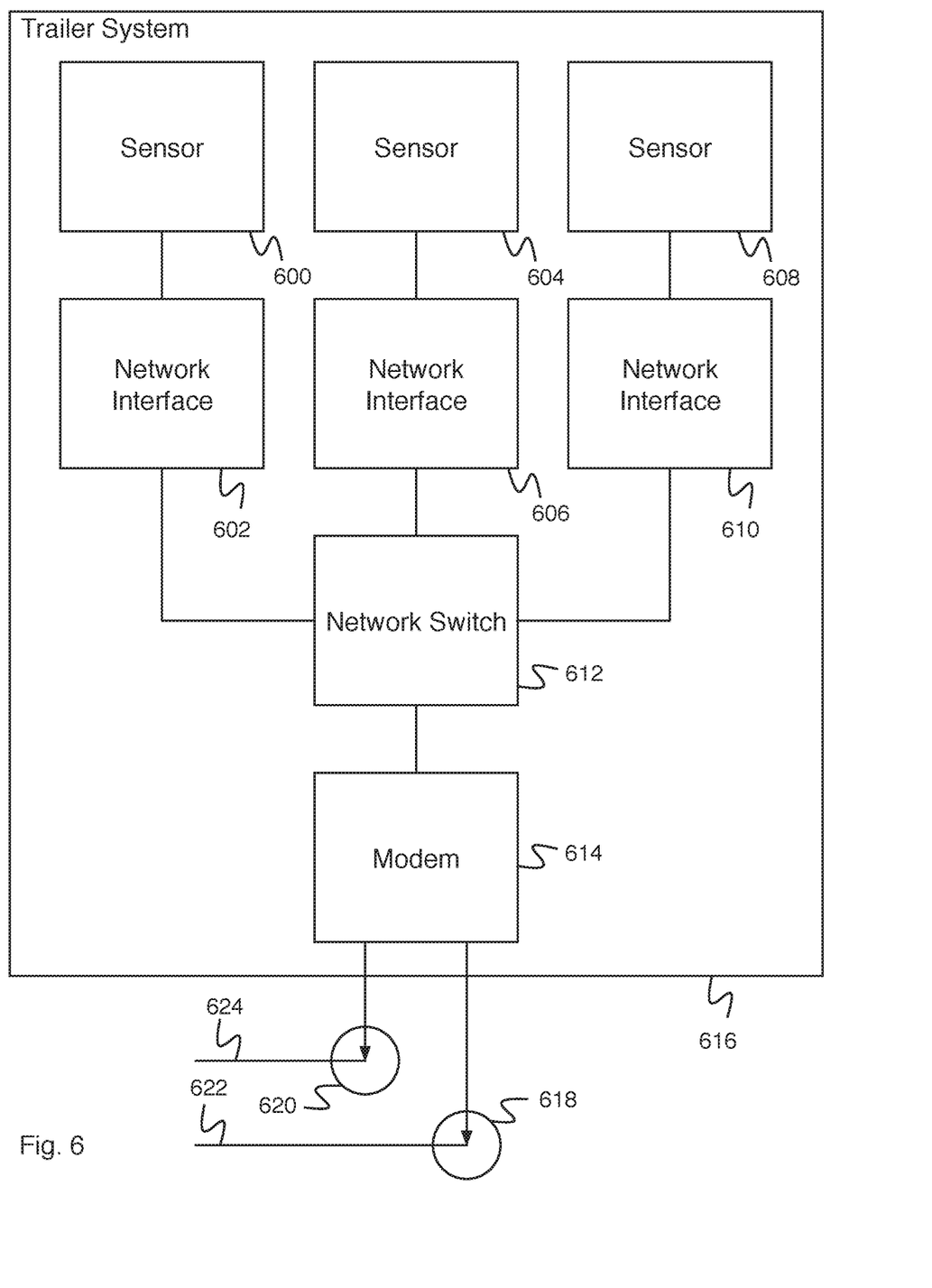
FIG. 6 is a block diagram illustrating an embodiment of a trailer system.

FIG. 6 is a block diagram illustrating an embodiment of a trailer system. In some embodiments, the elements of FIG. 6 are mounted on trailer 200 of FIG. 2. In the example shown, trailer system 616 includes sensors, network interfaces, a network switch, and a modem. Sensors (e.g., sensor 600, sensor 604, and sensor 608) comprise sensors for sensing vehicle data or external data. For example, sensor 600 comprises a camera, sensor 604 comprises a microphone and amplifier, and sensor 608 comprises an accelerometer. Sensor 600 is coupled to network interface 602, sensor 604 is coupled to network interface 606, and sensor 608 is coupled to network interface 610. Network interfaces (e.g., interface 602, network interface 606, and network interface 610) comprise network interfaces for communicating sensor data via a network, for example, an Ethernet network. Network interface 602, network interface 606, and network interface 610 transmit sensor data using a network protocol to network switch 612. Network switch 612 comprises a network switch for simultaneously communicating with multiple network devices. Network switch 612 communicates sensor data received from network interface 602, network interface 606, and network interface 610 to modem 614. Modem 614 receives sensor data and outputs modulated sensor data. Modulated sensor data is coupled using coupling 620 and coupling 618 onto wire 624 and wire 622. In various embodiments, wire 622 and/or wire 624 comprise a wire used for connecting a vehicle to a turn right signal, a turn left signal, a running light signal, a stop signal, a light signal, a marker signal, a brake signal, an identifier signal, a ground signal, a power signal, or any other appropriate signal.

Figure 7:
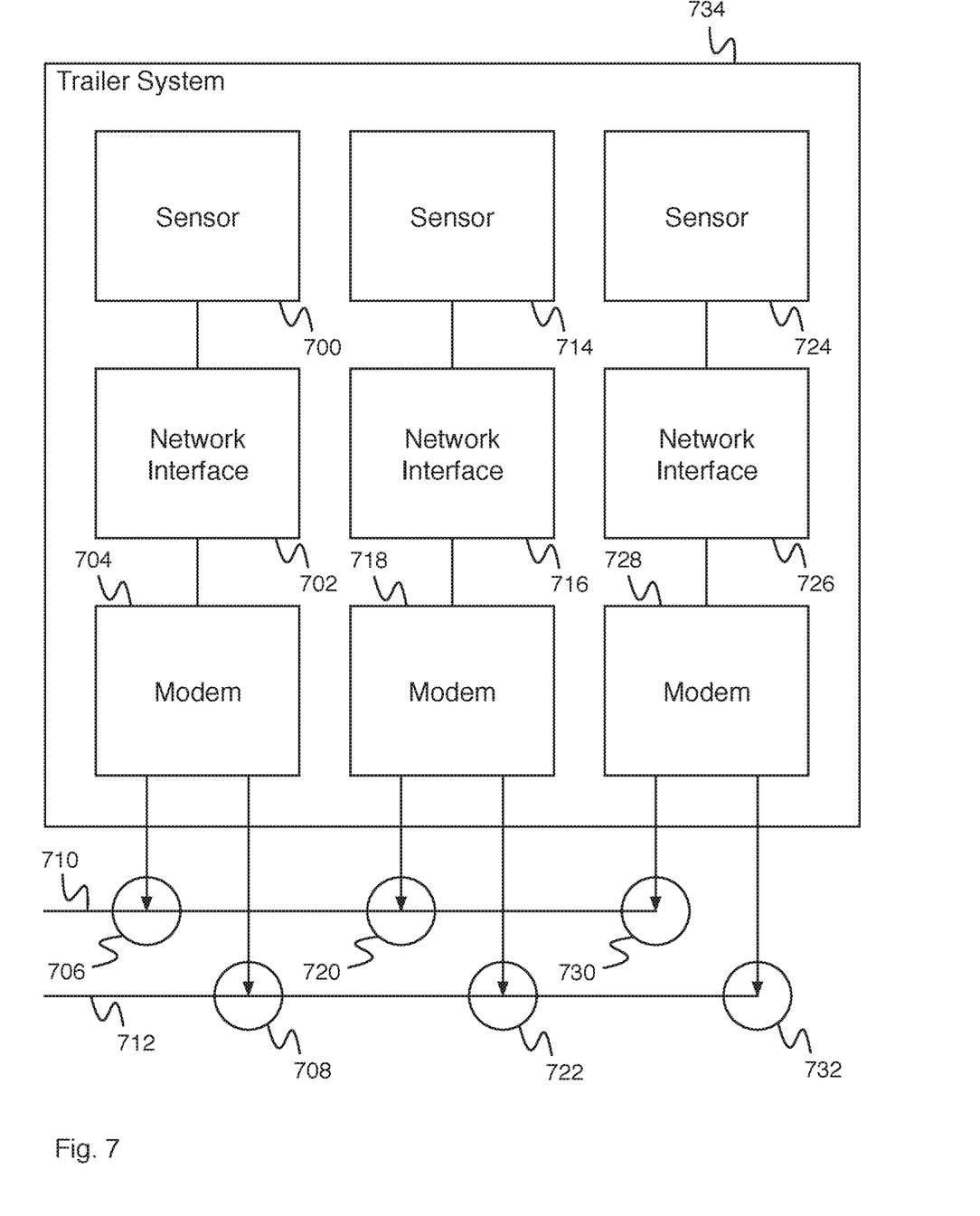
FIG. 7 is a block diagram illustrating an embodiment of a connection of a trailer system.

FIG. 7 is a block diagram illustrating an embodiment of a connection of a trailer system. In some embodiments, the elements of FIG. 7 are mounted on trailer 200 of FIG. 2. In the example shown, trailer system 734 includes sensors, network interfaces, and modems. Sensors (e.g., sensor 700, sensor 714, and sensor 724) comprise sensors for sensing vehicle data or external data. For example, sensor 700, sensor 714, and sensor 724 each comprise accelerometers mounted at different points on the trailer. Sensor 700 is coupled to network interface 702, which transmits sensor data using a network protocol to modem 704. Sensor 714 is coupled to network interface 716, which transmits sensor data using a network protocol to modem 704. Sensor 724 is coupled to network interface 726, which transmits sensor data using a network protocol to modem 728. Modem 704 receives sensor data and outputs modulated sensor data. Modulated sensor data is coupled using coupling 706 and coupling 708 onto wire 710 and wire 712. Modem 718 receives sensor data and outputs modulated sensor data. Modulated sensor data is coupled using coupling 720 and coupling 722 onto wire 710 and wire 712. Modem 728 receives sensor data and outputs modulated sensor data. Modulated sensor data is coupled using coupling 730 and coupling 732 onto wire 710 and wire 712. Modem 704, modem 718, and modem 728 utilize a multiple accessing scheme in order to not interfere with one another. For example, modem 704, modem 718, and modem 728 utilize time domain multiple accessing (e.g., TDMA). In some embodiments, modem 704, modem 718, and modem 728 are in direct communication with one another in order to implement the multiple accessing scheme (e.g., in order to synchronize timing). In various embodiments, wire 710 and/or wire 712 comprise a wire used for connecting a vehicle to a turn right signal, a turn left signal, a running light signal, a stop signal, a light signal, a marker signal, a brake signal, an identifier signal, a ground signal, a power signal, or any other appropriate signal.

Figure 8:
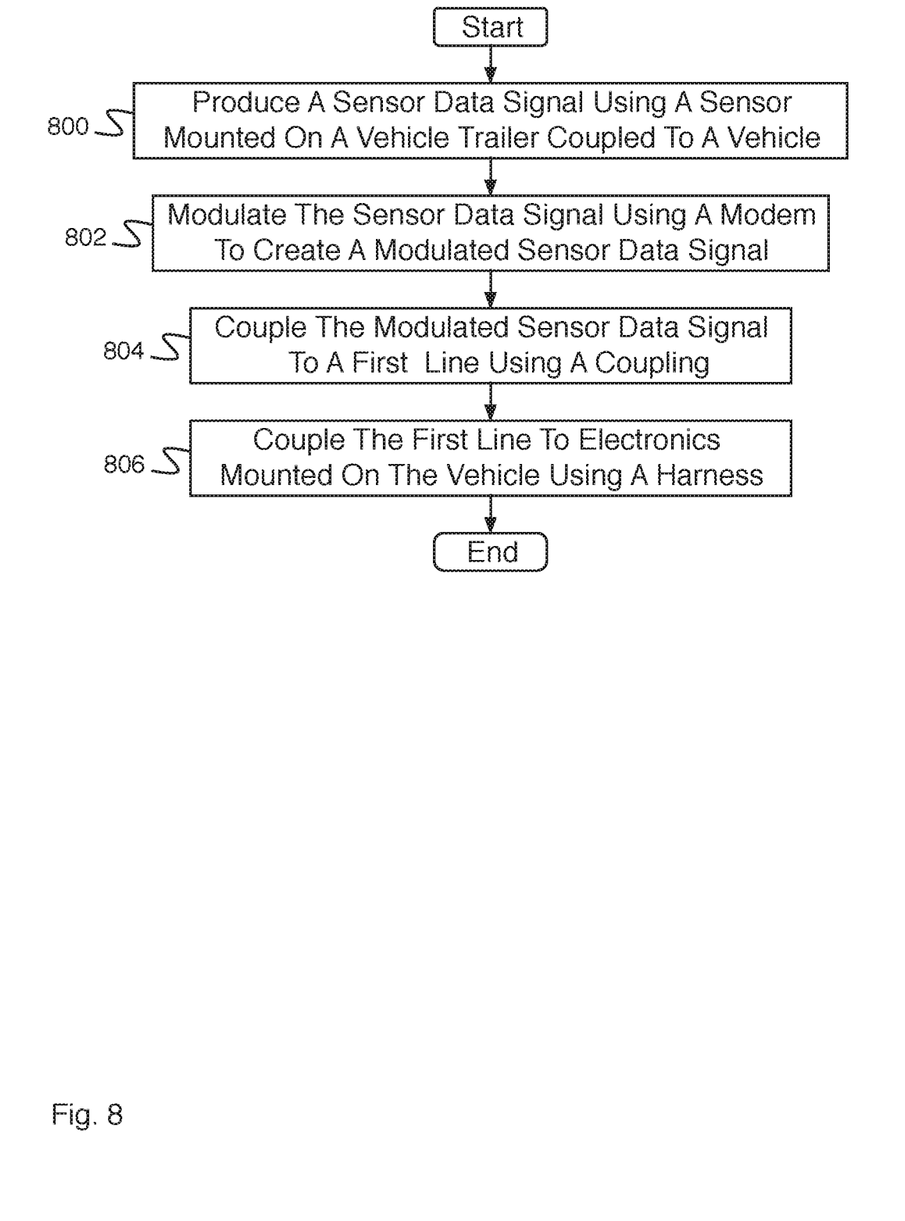
FIG. 8 is a flow diagram illustrating an embodiment of a process for a tractor-trailer data link for a semi-truck.

FIG. 8 is a flow diagram illustrating an embodiment of a process for a tractor-trailer data link for a semi-truck. In some embodiments, the process of FIG. 8 is executed using elements mounted on a trailer (e.g., trailer 200 of FIG. 2). In the example shown, in 800, a sensor data signal is produced using a sensor mounted on a vehicle trailer. For example, a trailer mounted sensor on a trailer produces a sensor data signal, where the trailer is coupled to a vehicle. In 802, the sensor data is modulated using a modem to create a modulated sensor data signal. For example, the sensor data is modulated to create a single-ended modulated sensor data signal. In 804, the modulated sensor data signal is transmitted using a first line. For example, the modulated sensor data signal is coupled to a first line using a coupling. In 806, the first line is coupled to electronics mounted on the vehicle using a harness.

In some embodiments, the sensor data is modulated to create a differential modulated sensor data signal. The differential modulated sensor data signal is coupled to the first line and a second line using a coupling, and the first line and the second line are coupled to electronics mounted on the vehicle using a harness.

Figure 9A:
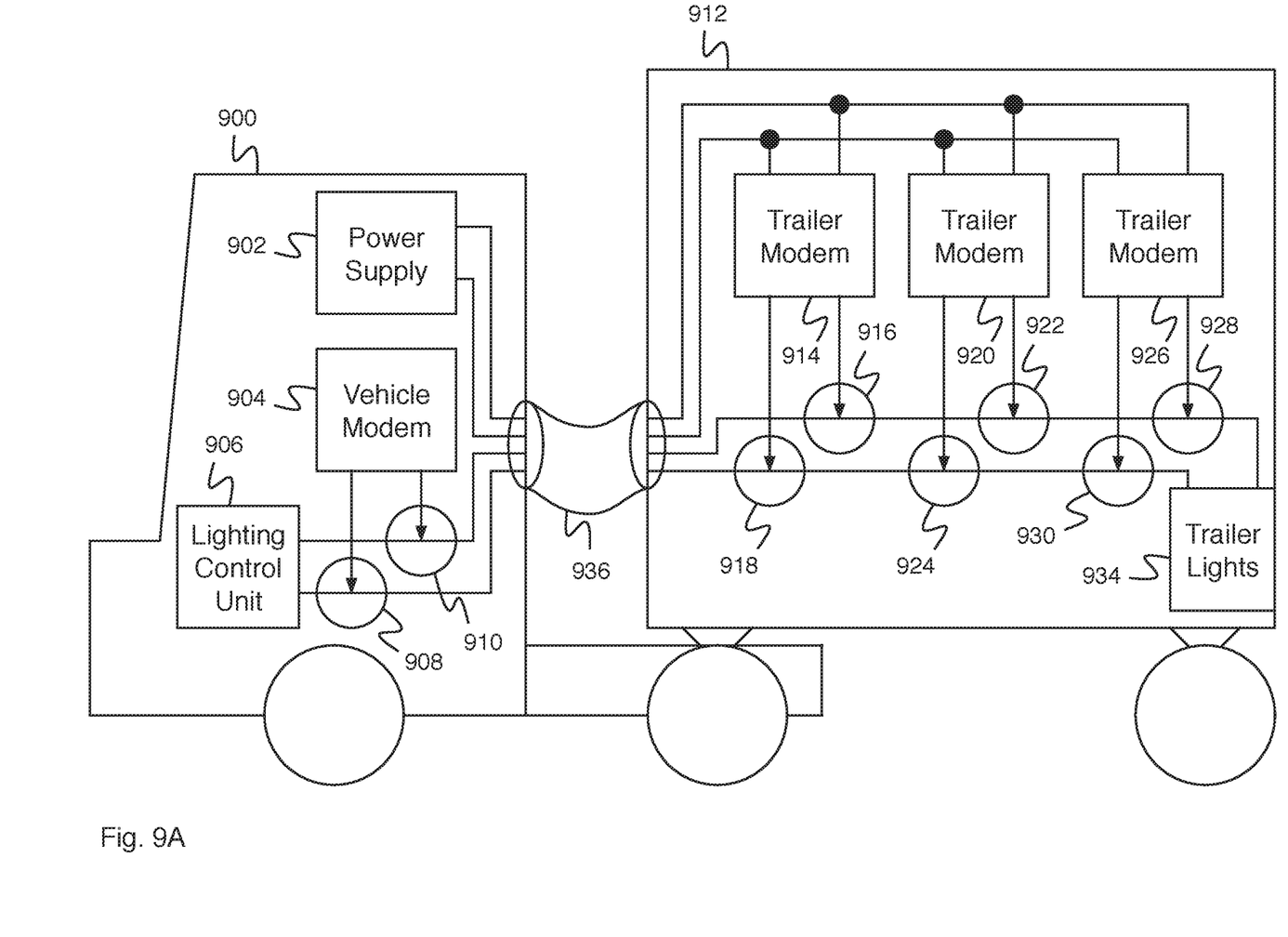
FIG. 9A is a block diagram illustrating an embodiment of a tractor-trailer system.

FIG. 9A is a block diagram illustrating an embodiment of a tractor-trailer system. In some embodiments, tractor 900 comprises vehicle 106 of FIG. 1 and trailer 912 comprises trailer 112 of FIG. 1. In the example shown, tractor 900 comprises power supply 902. Power supply 902 comprises a power supply configured to generate a power supply voltage on a pair of power supply wired (e.g., +12 Volts referenced to ground). The power supply voltage is coupled to trailer 912 via harness 936 for powering trailer electronics. Tractor 900 additionally comprises lighting control unit 906 for creating lighting control signals (e.g., turn signal control signals, brake light signals, marker light signals, tail light signals, etc.). Lighting control signals are coupled to trailer 912 via harness 936 for controlling trailer lights 934. Vehicle modem 904 comprises a vehicle modem configured to send and/or receive data to and from electronics on trailer 912. Signals from vehicle modem 904 are coupled to lighting control wires using coupling 908 and coupling 910. For example, coupling 908 and coupling 910 comprise capacitive couplings. Trailer 912 comprises trailer modem 914, trailer modem 920, and trailer modem 926. Each of trailer modem 914, trailer modem 920, and trailer modem 926 are powered by power supply wires receiving power from power supply 902, and comprise output signals coupled to lighting control wires from lighting control unit 906. Trailer modem 914 is coupled to lighting control wires using coupling 916 and coupling 918, for example comprising capacitive couplings. Trailer modem 920 is coupled to lighting control wires using coupling 922 and coupling 924, for example comprising capacitive couplings. Trailer modem 926 is coupled to lighting control wires using coupling 928 and coupling 930, for example comprising capacitive couplings. Each of trailer modem 914, trailer modem 920, and trailer modem 926 communicate with vehicle modem 904. For example, trailer modem 914, trailer modem 920, and trailer modem 926 communicate with vehicle modem 904 using time-domain multiple accessing (e.g., taking turns communicating with vehicle modem 904) or another multiple accessing technique.

Figure 9B:
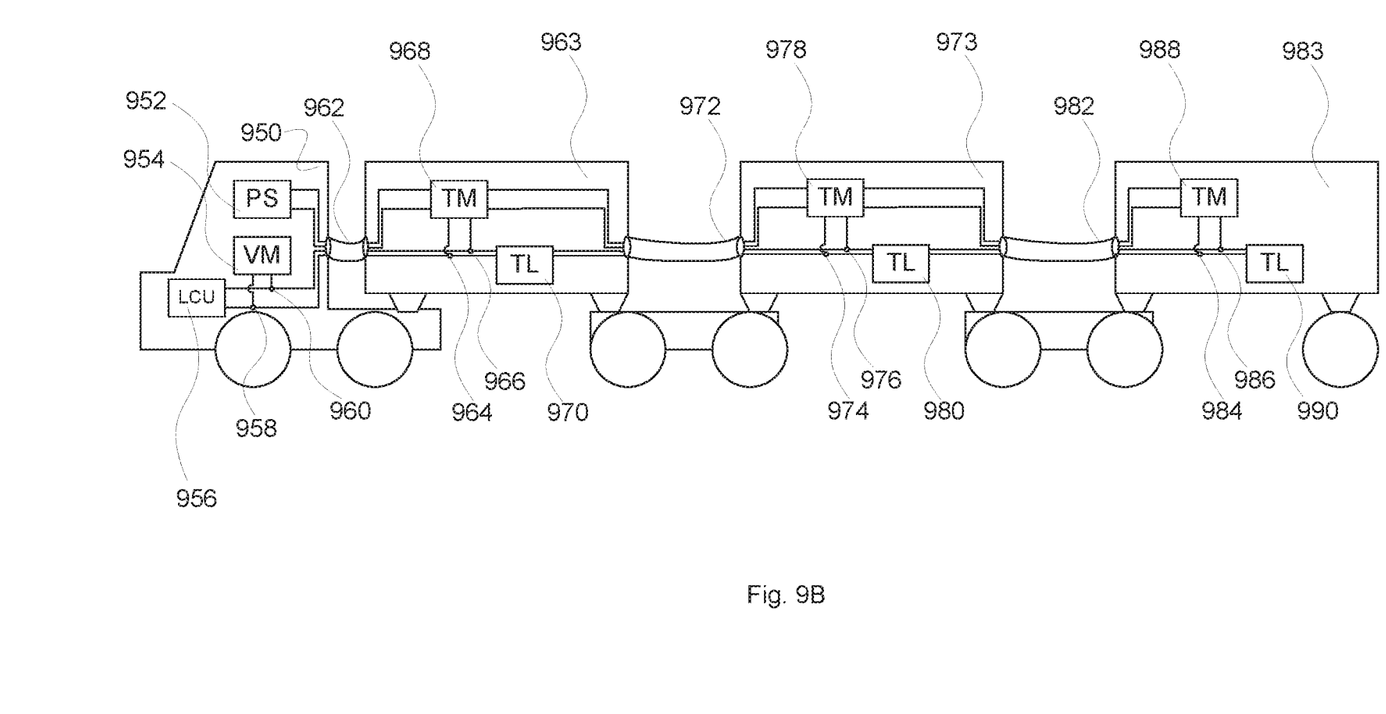
FIG. 9B is a block diagram illustrating an embodiment of a tractor-trailer system.

FIG. 9B is a block diagram illustrating an embodiment of a tractor-trailer system. In some embodiments, FIG. 9B comprises a tractor-trailer system, wherein multiple modems are distributed among more than one trailer (e.g. double trailers, triple trailers, etc.). In the example shown, tractor 950 comprises power supply 952. Power supply 952 comprises a power supply configured to generate a power supply voltage on a pair of power supply wired (e.g., +12 Volts referenced to ground). The power supply voltage is coupled to one or more trailers (e.g., trailer 963, trailer 973, trailer 983, etc.) via one or more harnesses (e.g., harness 962, harness 972, harness 982, etc.) for powering trailer electronics. Tractor 950 additionally comprises lighting control unit 956 for creating lighting control signals (e.g., turn signal control signals, brake light signals, marker light signals, tail light signals, etc.). Lighting control signals are coupled to one or more trailers (e.g., trailer 963, trailer 973, trailer 983, etc.) via harnesses (e.g., harness 962, harness 972, harness 982, etc.) for controlling trailer lights (e.g., trailer lights (e.g., TL 970, TL 980, TL 990, etc.). Vehicle modem 954 comprises a vehicle modem configured to send and/or receive data to and from electronics on the one or more trailers. Signals from vehicle modem 954 are coupled to lighting control wires using coupling 958 and coupling 960. For example, coupling 958 and coupling 960 comprise capacitive couplings. The one or more trailers (e.g., trailer 963, trailer 973, trailer 983, etc.) each have a trailer modem (e.g., TM 968, TM 978, TM 988, etc.). Each trailer modem is powered by power supply wires receiving power from power supply 952 and have input/output signaling wires coupled to lighting control wires from lighting control unit 956. Trailer modems (e.g., TM 968, TM 978, TM 988, etc.) are coupled to lighting control wires using coupling (e.g., coupling 964, coupling 966, coupling 974, coupling 976, coupling 984, coupling 986, etc.)—for example, capacitive couplings. Each of trailer modem (e.g., TM 968, TM 978, TM 988, etc.) communicates with vehicle modem 954. For example, trailer modems (e.g., TM 968, TM 978, TM 988, etc.) communicate with vehicle modem 954 using time-domain multiple accessing (e.g., taking turns communicating with vehicle modem 954) or another multiple accessing technique.

Figure 10:
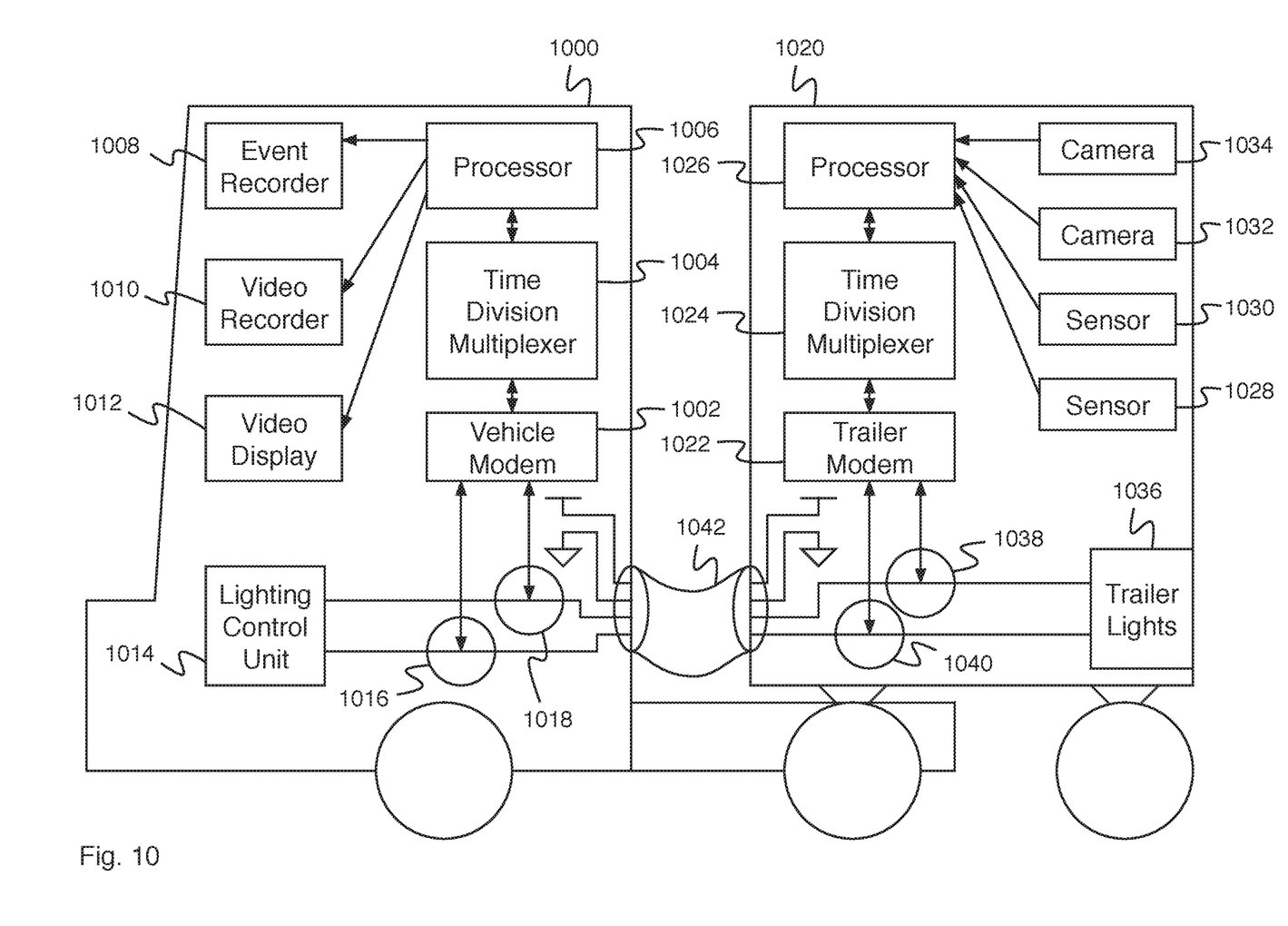
FIG. 10 is a block diagram illustrating an embodiment of a tractor-trailer system.

FIG. 10 is a block diagram illustrating an embodiment of a tractor-trailer system. In some embodiments, tractor 100 comprises vehicle 106 of FIG. 1 and trailer 1020 comprises trailer 112 of FIG. 1. In the example shown, tractor 1000 comprises vehicle modem 1002. Vehicle modem 1002 is coupled to lighting control wires from lighting control unit 1014 using coupling 1016 and coupling 1018, for example comprising capacitive couplings. Vehicle modem 1002 comprises a vehicle modem configured to send and/or receive data to and from electronics on trailer 1020. Vehicle modem 1002 communicates with time division multiplexer 1004 for multiplexing data to be delivered to multiple data receiving devices. Processor 1006 receives and processes data from time division multiplexer 1004 and provides the data to event recorder 1008, video recorder 1010, and video display 1012. Event recorder 1008 comprises an event recorder configured to determine anomalous events, record event data, process event data, etc. Video recorder 1010 comprises a video recorder configured to record video data. Video display 1012 comprises a video display configured to display video data. Lighting control wires from lighting control unit 1014 are coupled to trailer 1020 via harness 1042. Lighting control wires are coupled from harness 1042 to trailer lights 1036. Harness 1042 additionally couples power and ground wires. For example, power and ground voltages are generated by a power supply mounted in tractor 1000 and power trailer electronics on trailer 1020. Trailer modem 1022 is coupled to lighting control wires using coupling 1038 and coupling 1040, for example comprising capacitive couplings. Trailer modem 1022 comprises a modem configured to send and/or receive data to and from electronics on vehicle 1000. Trailer modem 1022 communicates with time division multiplexer 1024 configured to multiplex data to be delivered to multiple data providing devices. Processor 1026 receives and processes data from a set of signal sources and provides the data to time division multiplexer 1024. Processor 1026 receives data from sensor 1028, sensor 1030, camera 1032, and camera 1034. For example, sensor 1028 and sensor 1030 comprise one or more of an accelerometer, a gyroscope, a tilt sensor, a temperature sensor, a global positioning system, etc. For example, camera 1032 and camera 1034 comprise one or more of a forward-facing camera, a side-facing camera, a rear-facing camera, a camera mounted under trailer 1020, a camera mounted on a lift gate, etc.

Figure 11:
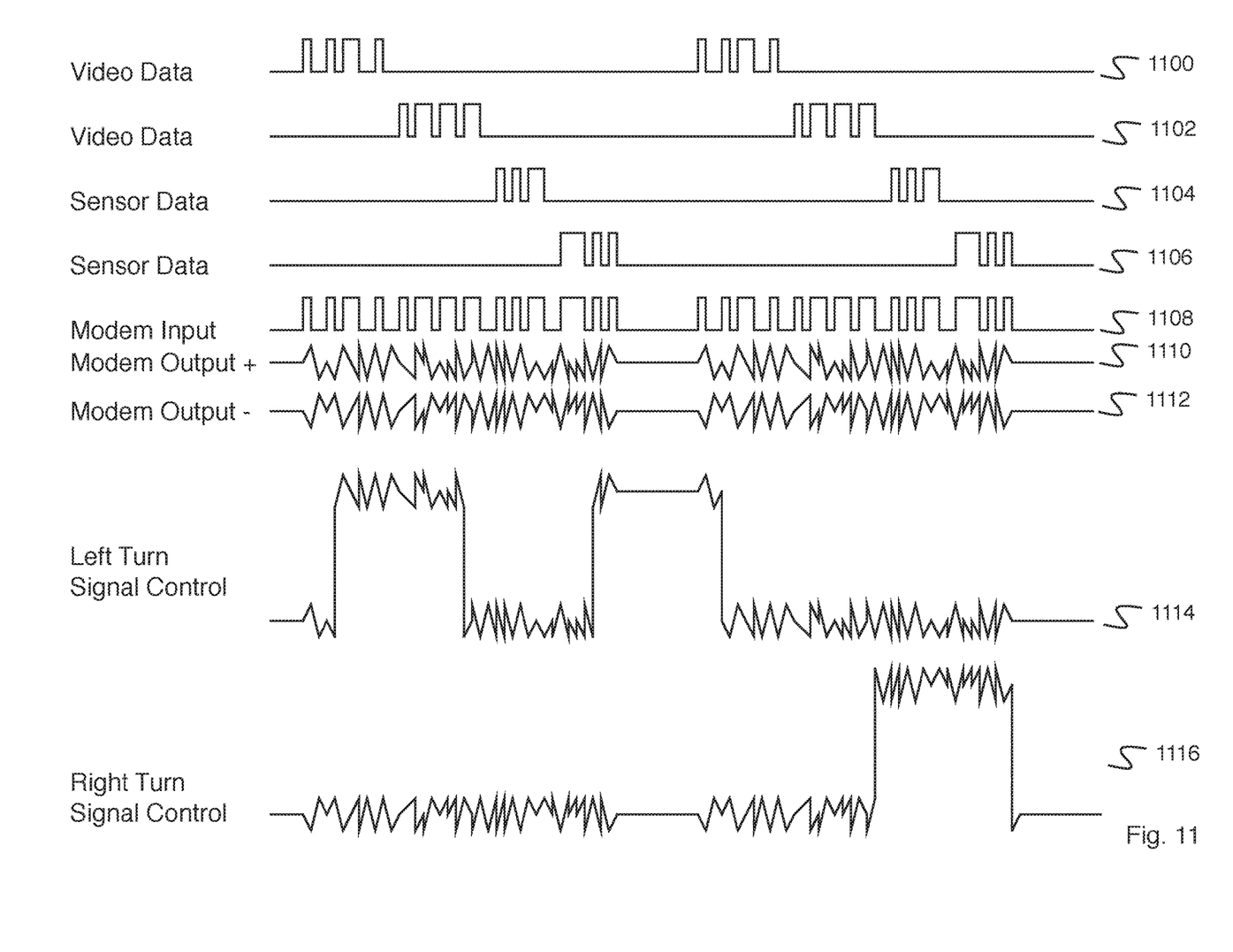
FIG. 11 is a diagram illustrating an embodiment of signals in a tractor-trailer system.

FIG. 11 is a diagram illustrating an embodiment of signals in a tractor-trailer system. In some embodiments, the signals of FIG. 11 comprise signals generated by systems of the tractor-trailer system of FIG. 10. In the example shown, video data 1100 comprises video data from a first video data source and video data 1102 comprises video data from a second video data source. For example, video data 1100 comprises compressed video data and 1102 comprises compressed video data. Sensor data 1104 comprises sensor data from a first sensor and sensor data 1106 comprises sensor data from a second sensor. For example, sensor data 1104 comprises compressed sensor data and sensor data 1106 comprises compressed sensor data. Modem input 1108 comprises an input signal to a modem comprising a combination of video data 1100, video data 1102, sensor data 1104, and sensor data 1106. For example, signals are combined using a time division multiplexor. Positive modem output 1110 and negative modem output 1112 comprise differential modem output signals generated by a modem. Positive modem output and negative modem output are coupled to turn signal control signals using couplers, for example capacitive couplers. Positive modem output 1110 is coupled to a left turn signal control signal to produce left turn signal control 1114 and negative modem output is coupled to a right turn signal to produce right turn signal control 1116. In the example shown, turn signal voltages comprise large voltage swings (e.g., 12 volts to ground). A turn signal voltage comprises an irregular pulse train with fundamental frequency much less than that of positive modem output 1110 or negative modem output 1112.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for a trailer mounted data sensor, comprising:
   a sensor configured to produce a sensor data signal that is mounted on a vehicle trailer; and
   a modem mounted on the vehicle trailer, wherein the modem is configured to modulate the sensor data signal to create a differential modulated sensor data signal, wherein the differential modulated sensor data signal is transmitted differentially for better noise immunity using a first line and a second line, and wherein the first line and the second line are coupled via a harness to electronics mounted on a vehicle.

2. The system of claim 1, wherein the sensor comprises a video camera, a digital camera, a microphone, an accelerometer, or a gyroscope.

3. The system of claim 1, wherein the sensor includes a network adapter for communicating with the modem via a network.

4. The system of claim 1, further comprising a plurality of sensors configured to produce a plurality of sensor data signals.

5. The system of claim 4, further comprising a network switch configured to couple each of the plurality of sensors to the modem.

6. The system of claim 4, further comprising a plurality of modems, wherein each sensor of the plurality of sensors is coupled to a modem of the plurality of modems.

7. The system of claim 6, wherein the plurality of modems use a time division multiplexing scheme.

8. The system of claim 1, wherein the electronics coupled to the vehicle comprises a modem configured to demodulate the differential modulated sensor data signal.

9. The system of claim 1, wherein the electronics coupled to the vehicle comprises a vehicle event recorder configured to process sensor data or analyzing sensor data to identify anomalous events.

10. The system of claim 1, wherein the electronics coupled to the vehicle comprises a data storage device configured to store sensor data or processed sensor data.

11. The system of claim 1, wherein the electronics coupled to the vehicle comprises an interface configured to provide data to a vehicle data server.

12. The system of claim 1, wherein the electronics coupled to the vehicle comprises a video terminal configured to display video to a vehicle driver.

13. The system of claim 1, wherein the differential modulated sensor data signal comprises the data signal modulated using orthogonal frequency division multiplexing.

14. The system of claim 1, wherein the sensor receives power via a power connector of the harness.

15. The system of claim 1, wherein the sensor is connected to ground using a trailer chassis.

16. The system of claim 1, wherein the first line comprises one of: a right turn signal line, a left turn signal line, a brake light line, a brake power line, an auxiliary line, a marker light line, or a tail light line.

17. The system of claim 1, wherein the harness comprises a SAE J560 coupling.

18. The system of claim 1, further comprising:
   an other sensor configured to produce an other sensor data signal that is mounted on an other vehicle trailer; and
   an other modem mounted on the other vehicle trailer, wherein the other modem is configured to modulate the other sensor data signal to create an other differential modulated sensor data signal, wherein the other differential modulated sensor data signal is transmitted differentially for better noise immunity using the first line and the second line, and wherein the first line and the second line are coupled via the harness and an other harness to the electronics mounted on the vehicle.

19. The system of claim 18, wherein the harness couples the vehicle to the vehicle trailer and the other harness couples the vehicle trailer and the other vehicle trailer.

20. A method for a trailer mounted data sensor, comprising:
   producing a sensor data signal using a sensor that is mounted on a vehicle trailer; and
   modulating the sensor data signal using a modem mounted on the vehicle trailer to create a differential modulated sensor data signal wherein the differential modulated sensor data signal is transmitted differentially for better noise immunity using a first line and a second line, and wherein the first line and the second line are coupled via a harness to electronics mounted on a vehicle.

* * * * *